United States Patent Office 2,875,206
Patented Feb. 24, 1959

2,875,206

TWO-STAGE METHOD FOR PREPARING CARBON-SUBSTITUTED PIPERAZINES

William W. Levis, Jr., Wyandotte, and William K. Langdon, Grosse Ile, Mich., assignors to Wyandotte Chemicals Corporation, Wyandotte, Mich., a corporation of Michigan No Drawing. Application February 21, 1957
Serial No. 641,496

8 Claims. (Cl. 260—268)

This invention relates to a two-stage method for preparing carbon-substituted piperazines. In a more specific aspect, this invention relates to an improved, low-cost method for preparing carbon-substituted piperazines, such as 2-methylpiperazine, employing an N($\beta$-hydroxyalkyl)-1,2-alkylenediamine and a finely divided nickel hydrogenation/dehydrogenation catalyst.

This application is a continuation-in-part of application Serial No. 361,881, filed June 15, 1953, now abandoned, and application Serial No. 422,428, filed April 12, 1954, now abandoned.

The known methods for preparing carbon-substituted piperazines employing an N($\beta$-hydroxyalkyl)-1,2-alkylenediamine and a finely divided nickel catalyst have all been inadequate for one or several reasons. A principal reason has universally been the low conversion obtained of the starting material, the diamine. This has been true even where large amounts of the expensive nickel catalyst were used, and high catalyst consumption has been a characteristic fault of the prior art methods.

Perhaps the most complete disclosure of the synthesis of piperazine and carbon-substituted piperazines is made by Leland J. Kitchen and C. B. Pollard in their publication in J. Am. Chem. Soc. 69, 854–855 (1947), and in their U. S. Patent No. 2,400,022 (1946). They disclosed in the Journal article the preparation of piperazine with a 32% yield by heating N-(2-hydroxyethyl)-ethylenediamine with Raney nickel catalyst under a distillation column. Another run employing a diluent, diethylcarbitol, gave a 34% yield. Runs in an autoclave wherein dioxane was employed as a diluent, the catalyst-diamine mixture was heated to 200–300° C., the catalyst was separated from the reaction mixture and the latter distilled provided a 50–51% yield of the piperazine product. These relatively unsatisfactory yields of product were only obtained by employing large amounts of the nickel catalyst, i. e., 10 and 16 weight percent, in the two runs reported. A further run reported by Kitchen et al. in the Journal article concerned the preparation of 2-methylpiperazine employing N-(2-hydroxypropyl)-ethylenediamine dioxane with Raney nickel under hydrogen pressure at 185–203° C. wherein a 52% yield was obtained.

The disclosure by Kitchen et al. is amplified in their U. S. Patent No. 2,400,022, and they particularly emphasize the desirability of dioxane as a diluent because it forms a low-boiling azeotropic mixture with the water released from the diamine reactant during the process and facilitates the removal of the water from the reaction product.

A more recent disclosure of a method for the synthesis of 2-methylpiperazine has been made by Beck et al. in J. Am. Chem. Soc. 74, 605–608 (1952), who obtained 54% of the 2-methylpiperazine product by heating N-(2-hydroxypropyl)-ethylenediamine with Raney nickel and hydrogen at 200 p. s. i. and at a temperature of 185–200° C. This conversion was obtained by the use of over 16 weight percent of the nickel catalyst in the diamine-catalyst mixture.

An object of this invention is, therefore, to provide an improved process for the synthesis of carbon-substituted piperazines.

A further object of this invention is to provide a method for synthesizing carbon-substituted piperazines with high conversions and yields, such as 80 to 90 percent.

A still further object of this invention is to provide such a high conversion process while at the same time greatly reducing the cost of the process by reducing the amount of the nickel catalyst that must be used.

It will be observed that the foregoing objectives are obtained and other important advantages are realized by the present invention which is a two-stage process for the preparation of carbon-substituted piperazines. We have obtained, consistently, conversions and yields of 2-methylpiperazine of about 90% while employing only about 4 weight percent of finely divided nickel catalyst in admixture with N(2-hydroxypropyl)-ethylenediamine. Such a conversion level at reduced catalyst concentration has been accomplished by the combination of new process steps and by the use of markedly lower temperatures than have been used in the prior art.

Our new process is a two-stage process. In the first stage, the N($\beta$-hydroxyalkyl)-1,2-alkylenediamine reactant is heated and stirred in admixture with a finely divided nickel hydrogenation/dehydrogenation catalyst for a period of hours, such as about 4 hours, at atmospheric pressure and at a low temperature, such as from 80 to 125° C. Finely divided nickel hydrogenation/dehydrogenation catalysts are available commercially as a suspension under water. The water is drained from the catalyst before use, but the catalyst is wet when used, and so some water is added to the system with the catalyst. Also, water is a product of the reaction, and the presence of water in the reaction product serves to provide an effective upper limit on the temperature observed in the first stage, i. e., the boiling point of the water-product mixture under atmospheric pressure.

After heating and stirring the diamine reactant with the catalyst in the first stage as described above, the second stage of the process consists of distilling the total reaction product in the presence of the catalyst. Although no unusual care need be taken in the distillation step, it is preferable to gradually increase the heat in the second stage so that the carbon-substituted piperazine product of interest is distilled overhead at its boiling point under atmospheric conditions, and the reaction is terminated when no further product distills.

One truly unusual feature of our method, and one that seems contrary to the teachings of the prior art, is that it is necessary that the distillation step in the second stage be carried out with the total reaction mixture. Thus, we have found that, even though the water was not removed from the reaction product of the first stage before distillation in the second stage, the conversion obtained was about 30–40% higher than that which was obtained by the methods of the prior art, as discussed above.

The N(2-hydroxyalkyl)-1,2-alkylenediamines that have been converted to carbon-substituted piperazines in the method of this invention correspond to the general formula, (A)
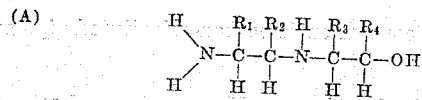

wherein $R_1$ and $R_2$ are hydrogen or alkyl radicals having 1 to 3, inclusive, carbon atoms, the total number of carbon atoms in the $R_1$ and $R_2$ substituents being not over 3. $R_3$ is hydrogen or an alkyl radical having 1 or 2 carbon atoms, and $R_4$ is an alkyl radical having from 1 to 3, inclusive, carbon atoms. The total number of carbon atoms in the alkyl radical substituents for $R_3$ and $R_4$ should not be over 3.

Thus, the N(2-hydroxyalkyl)-1,2-ethylene-, propylene-, butylene-, and amylenediamines defined by the above generic formula can be used in our process. Any such diamine reactant, or mixtures of the same, can be reacted in the two-stage process of this invention and high conversions and yields of corresponding carbon-substituted piperazines are obtained at very low catalyst requirements. Specific examples of diamine reactants can be named, as follows, but any diamine encompassed by the foregoing generic formula is within the scope of this invention: N(2-hydroxypropyl)-ethylenediamine, N(2-hydroxypropyl)-1,2-propylenediamine, N(2-hydroxypropyl)-1,2-butylenediamine, N(2-hydroxypropyl)-1,2-amylenediamine, N(2-hydroxybutyl)ethylenediamine, N(2-hydroxybutyl)-1,2-propylenediamine, N(1-methyl-2-hydroxypropyl)ethylenediamine, N(2-ethyl-2-hydroxypropyl)-1,2-propylenediamine, N(2-hydroxyamyl)ethylenediamine, and the like.

The carbon-substituted piperazines obtained from the process of the invention correspond in structure to the structure of the diamine reactant, since the over-all reaction can be written as follows:

(B) 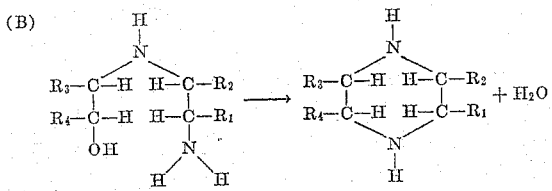

wherein $R_1$, $R_2$, $R_3$ and $R_4$ are the substituents set forth for Formula A. Examples of carbon-substituted piperazines which are obtained by the process of the invention are 2-methylpiperazine, 2,5-dimethylpiperazine, 2,6-dimethylpiperazine, 2-ethylpiperazine, 2-propylpiperazine, 2,3-dimethylpiperazine, 2-ethyl-5-methylpiperazine, 2-ethyl-6-methylpiperazine, and the like.

In the first stage of the process of the invention, the diamine reactant is heated and stirred with a finely divided nickel hydrogenation/dehydrogenation catalyst. Any finely divided nickel hydrogenation/dehydrogenation catalyst can be used. Alloy skeletal nickel catalyst is such a catalyst and is sold commercially as Raney nickel catalyst, Raney Catalyst Company, Chattanooga, Tennessee. Alloy skeletal nickel catalyst can be prepared by dissolving aluminum from finely divided nickel-aluminum alloy.

As has been mentioned hereinabove, a feature of the process of the invention is the small amount of the nickel catalyst which can be used. The catalyst which was used in the work reported herein was Raney nickel catalyst which is supplied as a suspension in water. The excess water was drained from the catalyst before use, but the catalyst was then used without further drying. The actual weight of nickel in the "wet catalyst" is about half the weight of the wet catalyst and the amount of catalyst used in our process is reported on a "dry" basis, obtained by dividing the actual weight of the wet catalyst by two. On such a dry catalyst basis, the amount of catalyst used in the first stage of the process is in the range of 1 to 5 weight percent of the mixture with the diamine reactant. Our highest conversions and yields of carbon-substituted piperazines were obtained with from 3 to 5 weight percent of catalyst in the mixture. These amounts of catalyst are in striking contrast to the amounts of catalyst used in the processes of the prior art which ranged from about 10 to 17 weight percent. Of course, such high amounts of catalyst can be used in our process, too, but no advantage is obtained in view of the high conversions and yields obtained with the lower amounts of catalyst as set forth above.

The mixture of diamine reactant and catalyst is heated and stirred in the first stage of the process. The temperature to which the mixture is heated is in the range of 80 to 125° C. The best temperature varies with the particular diamine used, but our highest conversions and yields of carbon-substituted piperazines were obtained when the temperature during the first stage was in the range from 90 to 115° C. A temperature at which we have consistently obtained high conversions and yields with low amounts of catalyst is about 100° C. It will be apparent that the temperature employed in the first stage of our process represents a new approach to the synthesis of carbon-substituted piperazines, since the processes of the prior art employed temperatures in the range from 200 to 300° C. in closed systems and about 150° C. when the reaction was carried out at atmospheric pressure.

The heating and stirring of the diamine reactant and nickel catalyst in the first stage is carried out for from about 2 to 8 hours. The concept of heating and stirring the diamine-catalyst mixture at a low temperature for a definite period of time in combination with the second stage of the process is a fundamental feature of this invention. We have obtained our best conversions and yields when the heating and stirring in the first stage was carried out for about 4 hours. Thus, heating and stirring the diamine-catalyst mixture for about 4 hours at about 100° C. represents our preferred conditions for the first stage of our process.

The process of this invention is a batch, liquid-phase, atmospheric pressure process. The heating and stirring of the diamine-catalyst mixture is carried out in a vessel fitted with a simple condenser or distillation head which can be vented through a second condenser. The diamine-catalyst mixture is usually stirred throughout the first stage, but any other method of thorough and continuous agitation can be used.

When the first stage of our process has been carried out as described above, the second stage is then carried out which consists in distilling the total reaction mixture produced in the first stage. The distillation step must be done in the presence of the catalyst and without any such prior treatment of the reaction product as removal of water, since the high conversions and yields at low catalyst levels afforded by our process are not obtained if either or both the catalyst and water in the reaction product are removed before the distillation is carried out. The distillation step in the second stage can be done conveniently by increasing the heat applied to the vessel in which the first stage of the process is carried out so that the carbon-substituted piperazine product is obtained as a distillate. The increase of heat in the second stage so as to facilitate the distillation is continued until no further product is obtained, and the temperature in the vessel from which the reaction product is distilled at the end of the process is usually in the range from 200 to 250° C.

The following examples are set forth to illustrate the method of the invention and should not be used to unduly restrict the scope of the invention as it has been described herein. The percent conversion to the carbon-substituted piperazine product reported in the examples was calculated as follows:

$$\text{Percent conversion to carbon-substituted piperazine (product)} = \frac{\text{moles of product obtained} \times 100}{\text{moles of diamine charged in first stage}}$$

Since the distillation step in the second stage was carried out by heating the product of the first stage until no further product was obtained, the heat ultimately applied in the second stage was considerably above the boiling point of the diamine reactant and no attempt was made to analyze the resinous catalyst mixture remaining at the end of the distillation step. The total product of the process was thereafter fractionally distilled in a 120 centimeter by 9 millimeter glass column packed with a Nichrome spiral surrounded by an electrical heating jacket. A cut was obtained at about the boiling point of the carbon-substituted piperazine product and the purity of the cut was determined by determining the neutral equivalent of the cut.

EXAMPLE 1

A series of runs was made according to the process of the invention for the production of 2-methylpiperazine employing N($\beta$-hydroxypropyl)-ethylenediamine and Raney nickel catalyst. The N($\beta$-hydroxypropyl)-ethylenediamine was prepared by the condensation of ethylenediamine with propylene oxide. The catalyst used was obtained from Raney Catalyst Company, Chattanooga, Tennessee. The apparatus employed was a 500 milliliter, 3-necked glass flask equipped with a stirrer, thermometer and simple distillation head. The runs were carried out and the product analyzed as set forth hereinabove.

The conditions under which these runs were made and the results of the runs are set forth below in the table.

Table

| Run No. | Concentration of Catalyst in Diamine-Catalyst Mixture, Weight Percent [1] | First Stage Conditions | | 2-Methylpiperazine Conversion, Weight Percent |
|---|---|---|---|---|
| | | Temp., °C. | Time, hours | |
| 1 | 2.1 | 110 | 8 | 79 |
| 2 | 2.1 | 100 | 6 | 79 |
| 3 | 3.2 | 100 | 4 | 89 |
| 4 | 3.2 | 110 | 4 | 79 |
| 5 | 3.2 | 100 | 6 | 84 |
| 6 | 4.3 | 100 | 2 | 85 |
| 7 | 4.3 | 115 | 2 | 84 |
| 8 | 4.3 | 100 | 4 | 91 |
| 9 | 4.3 | 100 | 4 | 90 |
| 10 | 4.3 | 100 | 4 | 89 |
| 11 | 4.3 | 100 | 4 | 88 |
| 12 | 4.3 | 100 | 7 | 88 |

[1] Dry basis.

EXAMPLE 2

A run was made wherein a mixture of 2-ethylpiperazine and 2,3-dimethylpiperazine was produced. The diamine reactant was a mixture of diamines consisting mainly in N(2-hydroxybutyl)ethylenediamine and N(1-methyl-2-hydroxypropyl)ethylenediamine and containing a small proportion of N(2-methyl-2-hydroxypropyl)ethylenediamine, which diamine mixture was obtained by condensing 1,2-butylene oxide, 2,3-butylene oxide and isobutylene oxide with ethylenediamine.

The run was made according to the process of the invention, as described hereinabove, and the catalyst employed was Raney nickel. The diamine-catalyst mixture contained 3.6 weight percent of Raney nickel catalyst (dry basis), and the diamine-catalyst mixture was stirred and heated in the first stage for 3¼ hours at 100° C. The total reaction product was then distilled in the presence of the catalyst and the carbon-substituted piperazines recited above boiling at 160–174° C., upon subsequent fractional distillation, were obtained with a conversion of 80 weight percent.

EXAMPLE 3

A mixture of 2,5-dimethylpiperazine and 2,6-dimethylpiperazine is prepared by the process of this invention by employing N($\beta$-hydroxypropyl)-1,2-propylenediamine as the diamine reactant. A mixture of 396 grams of N($\beta$-hydroxypropyl-1,2-propylenediamine and 15 grams of Raney nickel catalyst is stirred and heated in the first stage of the process of this invention as described hereinabove for 4 hours at 100° C. Subsequently, the heat is increased in the reaction vessel so as to distill the mixed dimethylpiperazine product out of the total reaction product. The distillate product thus obtained is analyzed by fractional distillation and 271 grams of solid dimethylpiperazine, boiling at 159–163° C. is obtained. The mixture of 2,5- and 2,6-dimethylpiperazine obtained represents an 85 weight percent conversion.

EXAMPLE 4

A product mixture of 2-ethyl-5-methylpiperazine, 2-ethyl-6-methylpiperazine and 2,3,5-trimethylpiperazine was prepared by the process of the invention employing a mixture of diamines containing a major proportion of N(2-hydroxybutyl)-1,2-propylenediamine and a minor amount of N(1-methyl-2-hydroxypropyl)-1,2-propylenediamine as the diamine reactant. The diamine reactant mixture was prepared by condensing a commercial mixture of butylene oxides, sold by The Dow Chemical Company as Butylene Oxide S and containing 1,2-butylene oxide, 2,3-butylene oxide and a small amount of isobutylene oxide, with propylenediamine. A mixture of the diamine reactant and Raney nickel catalyst containing 3.2 weight percent (dry basis) of the nickel catalyst was heated and stirred in the first stage of the process of the invention, as described hereinabove, for 4 hours at 100° C. Thereafter, the reaction mixture was fractionally distilled, and a product mixture boiling from 145 to 185° C. was obtained. Based on the weight of the product mixture, there was a conversion of 72 weight percent to carbon-substituted piperazines, i. e., 2-ethyl-5-methylpiperazine, 2-ethyl-6-methylpiperazine and 2,3,5-trimethylpiperazine.

It will be noted that our process provides higher conversions of carbon-substituted piperazines at substantially lower catalyst cost than has been provided by the prior art methods. Our invention, therefore, resides in a new and improved process based on new process steps combined with new and different reaction conditions. In spite of the suggestions in the prior art that it is desirable to remove the water of reaction, we have succeeded in obtaining conversions to the products of interest ranging from 30 to 40 weight percent (based on the weight of the diamine reactant) higher than has been previously reported, to our knowledge, by our new process which involves retention of the water of reaction throughout the process.

We claim:

1. A two-stage method for preparing carbon-substituted piperazines, which comprises, heating and stirring a mixture of a finely divided nickel hydrogenation/dehydrogenation catalyst and an N($\beta$-hydroxyalkyl)-1,2-alkylenediamine according to the formula

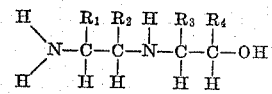

wherein $R_1$ and $R_2$ are members selected from the group consisting of hydrogen and alkyl radicals having from 1 to 3, inclusive, carbon atoms, the total number of carbon atoms in said alkyl radical substituents for $R_1$ and $R_2$ being not over 3, $R_3$ is a member selected from the group consisting of hydrogen and alkyl radicals having from 1 to 2 carbon atoms, inclusive, $R_4$ is an alkyl radical having from 1 to 3 carbon atoms, and the total number of carbon atoms in said alkyl substituents for $R_3$ and $R_4$ being not over 3, said heating step being carried out in liquid phase at about atmospheric pressure at a temperature in the range from 80–125° C. and for a time in the range from 2–8 hours, said mixture of catalyst and N($\beta$-hydroxyalkyl)-1,2-alkylenediamine containing from 1–5 weight percent on a dry basis of said finely divided nickel catalyst, and subsequently distilling the total product of said heating step in the presence of said catalyst.

2. A method according to claim 1 wherein said heating step is carried out at a temperature in the range from 90 to 115° C. and said mixture of nickel catalyst and N($\beta$-hydroxyalkyl)-1,2-alkylenediamine contains from 3–5 weight percent on a dry basis of said catalyst.

3. A method according to claim 2 wherein said nickel catalyst in an alloy skeletal nickel hydrogenation/dehydrogenation catalyst.

4. A method according to claim 3 wherein said N($\beta$-hydroxyalkyl)-1,2-alkylenediamine is N($\beta$-hydroxypropyl)ethylenediamine.

5. A method according to claim 3 wherein said N($\beta$-hydroxyalkyl)-1,2-alkylenediamine is N($\beta$-hydroxypropyl)-1,2-propylenediamine.

6. A method according to claim 3 wherein said N($\beta$-hydroxyalkyl)-1,2-alkylenediamine is N(2-hydroxybutyl)ethylenediamine.

7. A method according to claim 3 wherein said N($\beta$-hydroxyalkyl)-1,2-alkylenediamine is N(2-hydroxybutyl)-1,2-propylenediamine.

8. A method according to claim 3 wherein said N($\beta$-hydroxyalkyl)-1,2-alkylenediamine is N(1-methyl-2-hydroxypropyl)ethylenediamine.

References Cited in the file of this patent

Beck et al.: Jour. Am. Soc., vol. 74, pages 605–608 (1952).

UNITED STATES PATENT OFFICE

CERTIFICATE OF CORRECTION

Patent No. 2,875,206                      February 24, 1959

William W. Levis, Jr. et al.

It is hereby certified that error appears in the printed specification of the above numbered patent requiring correction and that the said Letters Patent should read as corrected below.

Column 1, line 55, before "dioxane" insert -- in --; column 7, line 2, for "catalyst in" read -- catalyst is --.

Signed and sealed this 30th day of June 1959.

(SEAL)
Attest:

KARL H. AXLINE                              ROBERT C. WATSON
Attesting Officer                            Commissioner of Patents